United States Patent
Baker (10) Patent No.: US 11,536,592 B2
(45) Date of Patent: Dec. 27, 2022

(54) POSITION ENCODER CONTROLLER

(71) Applicant: e1ectr0n, Inc., Hillsboro, OR (US)

(72) Inventor: Scott L. Baker, Portland, OR (US)

(73) Assignee: E1ECTR0N, INC., Hillsboro, OR (US)

( * ) Notice: Subject to any disclaimer, the term of this patent is extended or adjusted under 35 U.S.C. 154(b) by 0 days.

(21) Appl. No.: 17/362,461

(22) Filed: Jun. 29, 2021

(65) Prior Publication Data

US 2021/0325209 A1    Oct. 21, 2021

Related U.S. Application Data (62) Division of application No. 16/515,944, filed on Jul. 18, 2019, now Pat. No. 11,079,259.

(51) Int. Cl.
  *G01D 5/347*    (2006.01)
(52) U.S. Cl.
  CPC ....... *G01D 5/34707* (2013.01); *G01D 5/3473* (2013.01)
(58) Field of Classification Search
  CPC ........... G01D 5/34715; G01D 5/34707; G01D 5/347; G01D 5/34746; G01D 5/34776; G01D 5/34784; G01D 5/34792; G01D 5/3473; G01D 5/12; G01D 5/14; G01D 5/142; G01D 5/145; G01D 5/147; G01D 5/16; G01D 5/165; G01D 5/1655; G01D 5/24; G01D 5/2405; G01D 5/2412; G01D 5/2415; G01D 5/24471; G01D 5/24476; G01D 5/24485
  See application file for complete search history.

(56) References Cited

U.S. PATENT DOCUMENTS

| | | | |
|---|---|---|---|
| 5,763,874 A | 6/1998 | Luciano et al. | |
| 7,324,566 B2 | 1/2008 | Baker | |
| 7,482,575 B2 | 1/2009 | Sidor et al. | |
| 11,079,259 B2 | 8/2021 | Baker | |
| 2007/0138381 A1 | 6/2007 | Meschko | |
| 2007/0205736 A1 | 9/2007 | Lindberg et al. | |
| 2015/0070001 A1 | 3/2015 | Villaret | |
| 2018/0231400 A1 | 8/2018 | Okumura et al. | |

(Continued)

OTHER PUBLICATIONS

Kollmorgan Support, Sine Encoder, Jan. 9, 2018, Retrieved from https://www.kollmorgen.com/en-us/developer-network/sine-encoder/ on Jun. 14, 2019.

*Primary Examiner* — John R Lee
(74) *Attorney, Agent, or Firm* — Summit Patents PC (57) ABSTRACT

A controller for use with a position encoder includes one or more motion inputs suitable to couple to motion outputs of the position encoder and a limit input suitable to couple to a limit output of the position encoder. The controller also includes an actuator interface, a command interface, and circuitry coupled to the one or more motion inputs, the limit input, the actuator interface, and the command interface. The circuitry is configured to receive a command through the command interface to move a structural member coupled to the position encoder to a new position and control an actuator through the actuator interface to move the structural member toward the new position. A limit indication is received from the position encoder through the limit input and the controller stops or reverses the movement of the structural member by controlling the actuator in response to receiving the limit indication.

20 Claims, 5 Drawing Sheets

(56) References Cited

U.S. PATENT DOCUMENTS

2020/0064155 A1 2/2020 Wang et al.
2021/0018340 A1 1/2021 Baker
2021/0325209 A1* 10/2021 Baker .................. G01D 5/3473

* cited by examiner

POSITION ENCODER CONTROLLER

CROSS-REFERENCE TO RELATED APPLICATIONS

This application is a divisional of U.S. patent application Ser. No. 16/515,944 (now U.S. Pat. No. 11,079,259) entitled Position Encoder with Limits and filed on Jul. 18, 2019, which is hereby incorporated by reference in its entirety herein for any and all purposes.

BACKGROUND

Technical Field

The present subject matter relates to a controller for a position encoder, and more specifically, to a controller for a position encoder that incorporates limit indications for its movement.

Background Art

Position encoders that provide one or more signals to indicate movement of a tracked element of the encoder are well known in the art. A position encoder may be used to track rotation of a shaft or other object and may be referred to as a rotary encoder. Other embodiments of an encoder may be used to track linear motion of a component and may be referred to as a linear encoder. An incremental encoder does not provide an absolute position of the tracked element as it moves, but provides one or more signals to indicate of movement of the element. An absolute encoder provides information about the current position of the tracked element of the encoder, such as a shaft of an absolute rotary encoder.

Many incremental encoders have two outputs that provide signals with a 90° phase relationship to each other as the tracked element moves. These signals may be used to determine both a direction of movement and an amount of movement of the tracked element. The frequency of the signals is proportional to a velocity of the tracked element and the phase difference between the two signals can be used to determine the direction of movement.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Incremental encoders are used in many different applications. An incremental encoder can measure linear movement or rotational movement. While the concepts described herein are, in general, applicable to both linear and rotary encoders, most of the embodiments discussed herein are rotary encoders. Nonetheless, use of the concepts described herein for linear encoders is envisioned. Also, many of the descriptions of a rotary encoder use the word "disc" to describe a component of the encoder. As the word "disc" is used herein, the disc may be a substantially solid disc with a small hole or no hole through its axis of rotation, or may refer to an annular shape with a large hole in the center. The shape may be substantially circular or may have a non-circular shape and in some embodiments, the disc may only include a sector of a disc or a portion of an annular ring, depending on the range of movement monitored by the encoder. It should also be mentioned that while a linear encoder may not use a disc, it may have a component having another shape that has the same function as the disc in a rotary encoder and the word "disc" as used herein may also refer to the monitored element of a linear encoder.

Any type of encoder technology may be used for the incremental encoder, including mechanical contact of conductors, optical technology, magnetic technology, or capacitive technology, as non-limiting examples.

A mechanical encoder may utilize a conductive disc with one or more concentric rings of alternating insulated and conductive areas. A wiping contact may be used for each ring to determine if the contact is at an insulating or a conductive portion of that ring which is used to generate motion signals, such as a generating a high pulse for conductive portions and a low pulse for insulating portions. Either the wiping contacts or the disc may rotate with the shaft of the encoder.

A capacitive encoder may include a rotating disc with alternating areas with one or more concentric rings of high and low dielectric constants. Electrodes may be positioned on opposing sides of the disc to form a capacitor. Capacitance can be measured as the disc rotates causing changes to the capacitance which can be used to generate motion signals.

A magnetic encoder may use a rotating disc with concentric rings of magnetic materials having varying poles or magnetic strengths. Magnetic sensors, such as magneto-resistive or Hall Effect sensors, may be used to detect the different magnetic fields of a ring passing the sensor as the disc rotates. The magnetic sensor outputs may then be used to generate motion signals.

An optical encoder may include a rotating disc with one or more concentric rings of alternating transparent and opaque areas. A second opaque element includes a slit or other opening that is positioned adjacent to the disc so that as the disc rotates, light from a light source on one side of the rotating disc can only shine through a single transparent area of a concentric ring of the disc at a time. A light sensor may be positioned on the other side of the disc/slit combination for each concentric ring to detect light passing through the transparent areas of each of the rings. The outputs of the light sensors may be used to generate motion signal outputs for the encoder.

Transparent, as the term is used herein and in the claims, should be broadly interpreted to include the generally accepted definition of translucent as well as the traditional definition of transparent. In addition, transparent should not be interpreted to require that 100% of a particular wavelength of light is transmitted. In various embodiments, transparent may be used to describe any amount of transmission of one or more wavelengths of light, such as any value between about 10% and 100%, such as at least 50%, at least 75%, or at least 90%. Similarly, opaque, as the term is used herein and in the claims, should not be interpreted to require that 100% of all wavelengths of light be blocked, but should instead be interpreted to mean that for at least one wavelength of interest, a substantial amount of light is blocked, such more than 50%, more than 75%, or more than 90%. In other cases, a transparent area and an opaque area should be evaluated as a system, with the transparent area simply referring to an area that allows more light through than the opaque area does. The difference in transmissivity between the transparent and opaque materials only needs to be enough to be detected by the light sensor, no matter the absolute amount of light transmitted or blocked by either the transparent area or the opaque area.

An incremental encoder may have any number of motion outputs to indicate movement. Some embodiments have a single output that simply generates a pulse for a given amount of movement. Examples may include a rotary encoder that generates 360 pulses for a full rotation, i.e. 1 pulse per degree of movement. In most cases, the direction of movement for an incremental encoder with a single output must be assumed as the single output may not be able to provide directional information.

Other embodiments of an incremental encoder may have two quadrature-encoded outputs, A and B. Both outputs may provide the same number of digital pulses per rotation, but the incremental encoder is configured to generate a 90° phase offset between the A and B signals. In some embodiments, the A and B signals are digital pulses. By determining whether the A signal leads B (a positive phase difference), or the B signal leads A (a negative phase difference), the direction of rotation can be determined, and the movement of the encoder determined down to one quarter of the arc per pulse provided by the encoder. This may be accomplished through the use of a simple state machine (which can be implemented as an asynchronous state machine or a synchronous state machine) and a counter to track the cumulative motion as shown in Table 1 below:

TABLE 1

| Current State | A & B Input & Next State | Counter Action |
|---|---|---|
| 00 | 01 | Decrement |
|  | 00 | Hold |
|  | 10 | Increment |
| 10 | 00 | Decrement |
|  | 10 | Hold |
|  | 11 | Increment |
| 11 | 10 | Decrement |
|  | 11 | Hold |
|  | 01 | Increment |
| 01 | 11 | Decrement |
|  | 01 | Hold |
|  | 00 | Increment |

So for example if each of signal A and B provide 360 digital pulses at a 50% duty cycle per rotation, the relative movement of the encoder can be determined by the state machine of Table 1 at a resolution of 15 minutes of arc (one quarter of 1° or 1 quarter of a pulse period). Various embodiments can provide any number of pulses per degree of rotation and different state machines may be used that may provide a lower resolution of tracking, such as a resolution of one half of a pulse period or a resolution of one pulse period which may allow the state machine to more reliably control the counter in a high-speed asynchronous embodiment.

In other embodiments, the incremental encoder may provide two analog outputs that effectively provide a sine wave and a cosine wave with the same frequency which is based on the speed of rotation of the rotating disc. The analog motion inputs can be used in various ways to track the motion, depending on the embodiment, but in at least one embodiment, the two analog signals are converted to digital signals by comparing them to a threshold voltage and used as inputs to a state machine similar to that shown in Table 1. Some embodiments may also use the voltage levels of sine and cosine to generate a tangent value and then compute an arctangent value as a fine-tuning value for the counter generated by the state machine to provide a much higher resolution for the position of the encoder.

One limitation of an incremental encoder is that the motion outputs only provide relative movement information, not an absolute position of the encoder. In some applications, an absolute position is not needed and in other applications, a known position can be determined using other parts of the system and used as a starting point for keeping track of the absolute position of the encoder based on the relative motion information provided by the motion outputs. Some incremental encoders may provide an output indicating a particular position, which may be known as an index position, a home position, a neutral position, or some other term, at a particular positon of the incremental encoder. This may be used to reset a position counter (e.g. position tracker or position register) which is then updated using the motion signals for further motion as discussed above.

Some applications of rotary encoders provide virtually unlimited movement of the encoder throughout its 360° range of rotation, including multiple full rotations in a single direction, such as the tracking movement of a conveyor belt or a ball in a computer mouse. In other applications, however, such as, but not limited to, tracking the movement of a segment of a robotic arm, the device using the rotary encoder might be damaged, or cause damage to other things, if the movement exceeds a predetermined range of motion. This problem may be addressed through the use of external 'bumpers' to physically block motion beyond a given point, and/or limit switches that provide an indication separate from the encoder that can be used to stop the motion beyond the limit. Such solutions may increase the cost or be prone to damage from the motion itself and switches may decrease the reliability of the system.

An incremental encoder that provides a limit output, in addition to the motion output(s) is disclosed herein. The encoder itself is designed to determine whether a predetermined limit to motion has been reached and provide an output signal that can be used by a controller to stop or reverse the motion. This allows the incremental encoder controller (or incremental controller interface) to limit motion of the encoder (and other structural members coupled to the moveable part of the encoder, e.g. a shaft) at a very low level in the hardware, without needing to rely on high-level application software running on a computer on top of an operating system. Also, because the limits are directly built into the encoder, the controller for that encoder does not need to know the absolute positions of the limits of the encoder. The controller can simply react to reception of an active limit signal by stopping or reversing the motion.

In embodiments of an incremental encoder, the carrier (e.g. disc) may have one or more concentric rings (or in a linear controller, parallel rows) of indicators (e.g. alternating transparent and opaque regions, varying magnetic fields, or varying dielectric constants, depending on the type of encoder) that are used to generate motion signals. The carrier may be coupled to a structural member being monitored and/or controlled using an actuator such as an electrical motor, a hydraulic cylinder, a pneumatic cylinder, or any other type of actuator. The structural member can be any physical part of a mechanical system, including, but not limited to, a segment of a robotic arm, a flap of an airplane, a door of a car, or print head of a computer printer. The encoder may be coupled to the structural member using a shaft through the axis of rotation of the carrier, using gears coupled to teeth on the outside edge of the carrier, or by any other mechanism.

The incremental encoder includes a first limit indicator and a second limit indicator positioned on the carrier at positions that correspond to a limit of motion of the structural member, and a sensor to interact with the limit indicators and generate a limit output of from the incremental encoder. In some embodiments, the limit indicators may be positioned on a separate concentric ring of the disc (or parallel row of the carrier for a linear encoder) from the indicators used to generate the motion signals, but in other embodiments the limit indicators may be of a different type than the motion indictors used to generate the motion signals and may be co-located with those motion indicators. As an example, the motion signals may be generated using optical sensors interacting with holes and opaque areas of the carrier and the limit signal may be generated by a Hall Effect sensor based on magnets placed on opaque areas of the carrier between holes. Note that while the limit output is described for use with an incremental encoder, the same techniques may have value for an absolute encoder as well and such use is envisioned.

A controller may be coupled to the incremental encoder to receive the motion signals and the limit signal. Any type of electronic circuitry may be used for the controller, including, but not limited to, a custom application-specific integrated circuit (ASIC), a field-programmable gate array (FPGA), a circuit board with one of more active electronic components, and/or a processor running software stored in a memory.

The controller may include circuitry to track the motion of the encoder using the motion signals. The tracking may be done by any technique suitable for the motion signals provided by the encoder, such as, but not limited to, simply counting pulses, using the quadrature tracking state machine shown in Table 1, or by using quadrature tracking with fine position adjustment using sine and/or cosine signals provided from the encoder.

The controller may also be coupled to an actuator through an actuator interface. The actuator may be adapted to move a structural member that is coupled to the encoder and may use the motion signals from the encoder to provide feedback used to determine how to control the actuator to move the structural member.

Reference now is made in detail to the examples illustrated in the accompanying drawings and discussed below.

Figure 1:
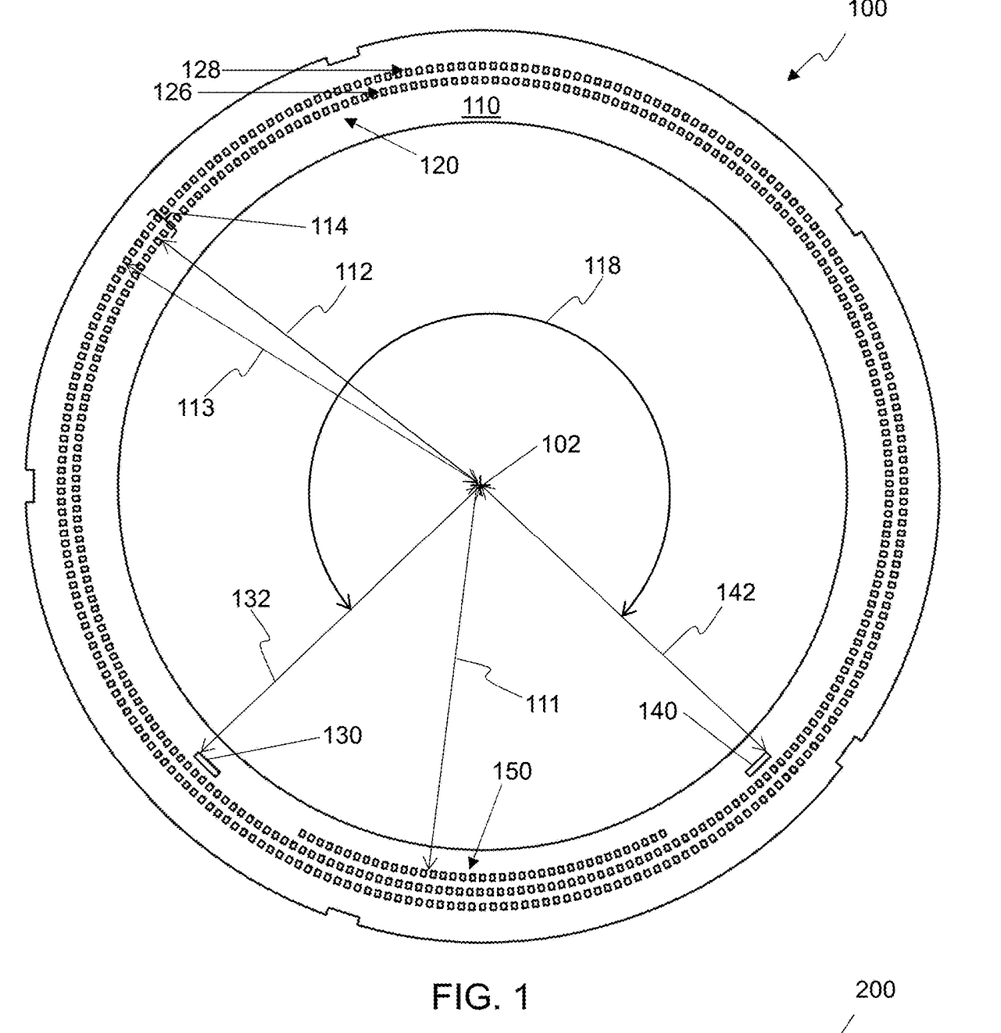
FIG. 1 shows an embodiment of a component of a rotary incremental encoder with limit indicators.

FIG. 1 shows an embodiment of a component 100 of a rotary incremental encoder with limit indicators 130, 140. The component 100 of the incremental rotary encoder includes a disc 110 (which may also be referred to as a carrier) adapted to rotate about an axis of rotation 102. The disc 110 includes a first transparent area 130, acting as a first limit indicator, positioned at a first polar distance 111 from the axis of rotation 102 at a first radial angle 132 on the disc 110, and a second transparent area 140, acting as a second limit indicator, positioned at the first polar distance 111 from the axis of rotation 102 at a second radial angle 142 on the disc 110. The first transparent area 130 and the second transparent area 140 are positioned on the disc 110 to interact with a limit sensor of the encoder. The first radial angle 132 on the disc corresponds to a first limit of the encoder and the second radial angle 142 on the disc 110 corresponds to a second limit of the encoder. The first radial angle 132 and the second radial angle 142 define an active sector 118 of the disc.

The disc 110 also includes encoding elements 120 located within a range 114 of distances from the axis of rotation 102 of the disc 110. The range 114 of distances from the axis of rotation 102 does not include the first polar distance 111. The encoding elements 120 include a first set 126 of alternating transparent and opaque areas of the disc 110 positioned at a second polar distance 112 from the axis of rotation 102 and a second set 128 of alternating transparent and opaque areas of the disc 110 positioned at a third polar distance 113 from the axis of rotation 102, the first set 126 of alternating transparent and opaque areas having a quadrature relationship with the second set 128 of alternating transparent and opaque areas. Both the first set 126 and second set 128 of alternating transparent and opaque areas of the disc 110 are spaced at a constant angular pitch and extend at least from the first radial angle 130 to the second radial angle 142 through the active sector 118 of the disc 110. During normal operation, sensors of the encoder interact with the encoding elements 120 in the active sector 118 of the disc 110.

The first transparent area 130, the second transparent area 140, the first set of transparent areas 126, and the second set of transparent areas 128 are transparent to at least one wavelength of near infrared light, visible light, or ultraviolet light. In some embodiments, the disc 110 is formed from an opaque material such as metal and one or more of the first transparent area 130, the second transparent area 140, the first set of transparent areas 126, or the second set of transparent areas 128 are formed by hole(s) through the disc 110. In other embodiments, the disc 110 may be formed from a transparent material, such as glass or plastic, and the opaque areas formed by a coating applied to the disc 110, such as paint, an opaque film, or some other opaque substance. The angular width of the first transparent area 130 and the second transparent area 140 may be the equal to each other in some embodiments, but in other embodiments, first transparent area 130 and the second transparent area 140 may have different angular widths to allow them to be differentiated. In some embodiments the first transparent area 130 and the second transparent area 140 may have the same angular width as a single transparent area of the encoding elements 120, but in other embodiments, one or both may be wider or narrower than a single transparent area of the encoding elements 120.

In some embodiments, the component 100 may also include error indicators 150 situated on the disc 110 at the first polar distance 111 from an axis of rotation 120 to interact with the limit sensor of the encoder. The error indicators 150 are located at a position of the carrier outside of a normal operational range of the encoder (e.g. outside of the active sector 118). The error indicators 150 may have a different angular width than the first transparent area 130 and the second transparent area 140 and may have a pitch that between them that may be used to generate a signal on the limit output of the encoder that can be used to generate an error condition to indicate that the encoder is outside of its normal operational range.

Figure 2:
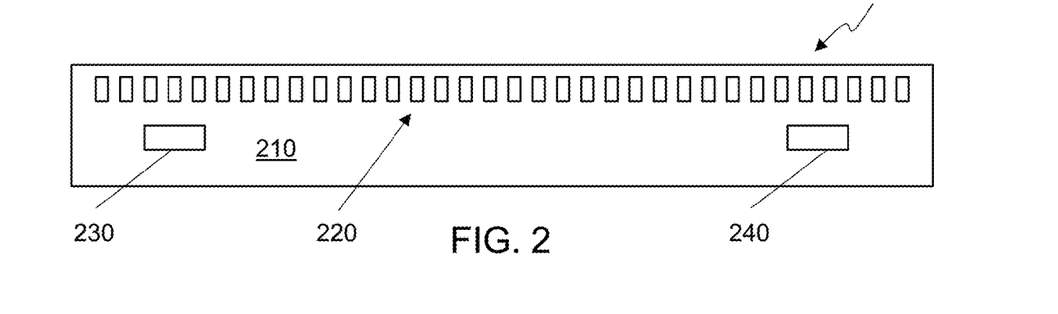
FIG. 2 shows an embodiment of a component of a linear incremental encoder with limit indicators.

FIG. 2 shows an embodiment of a component 200 of a linear incremental encoder with limit indicators 230, 240. The component 200 includes a carrier 210 adapted to move with respect to a first sensor and a second sensor of the encoder. While the carrier 210 is shown to have a rectangular shape, various embodiments may have a carrier with any shape. The component 200 also includes encoding elements 220 situated on the carrier 210 to interact with the first sensor.

The component 200 includes a first limit indicator 230 situated at a first location on the carrier 210 to interact with the second sensor at a first position of the carrier 210 corresponding to a first limit of the encoder, and a second limit indicator 240 situated at a second location on the carrier 210 to interact with the second sensor at a second position of the carrier corresponding to a second limit of the encoder.

The carrier 210 is adapted to move linearly past sensors of the encoder based on movement of a structural member coupled to the carrier 210. The movement of the carrier 210 cause the encoding elements 220 to interact with the first sensor of the encoder to generate pulses which can be counted by a controller to determine how far the carrier 210, and by inference, the structural member, has moved. Note that in the embodiment shown, the direction of movement of the carrier 210 may not be sensed by the encoder, so the controller may assume a direction of movement or determine the direction of movement using mechanisms other than the encoder.

The encoding elements 220 and the limit indicators 230, 240 may use any technology to interact with the first and second sensors. In some embodiments the encoding elements 220 and the limit indicators 230, 240 may be transparent areas or holes in the carrier 210 to allow light from a light source to shine through and be sensed by light sensitive receivers used for the second sensor.

In other embodiments, the carrier 210 may have an area between the first location on the carrier of the first limit indicator 230 and the second location on the carrier of the second limit indicator 240 that has a first dielectric constant in a first range, with the first limit indicator 230 and the second limit indicator 240 having a second dielectric constant outside of the first range. The second sensor may include electrodes on opposite sides of the carrier 210 may then be used to measure capacitance which may be different when the limit indicators 230, 240 are positioned between the electrodes than when the area between the limit indicators 230, 240 is positioned between the electrodes. The difference in capacitance can then be used to generate the motion signals.

In some embodiments, the first limit indicator 230 and the second limit indicator 240 may include a magnetized material with a magnetic pole that is different than the area between the two indicators 230, 240. The second sensor may include a magneto-resistive sensor or a Hall Effect sensor that is capable of detecting the magnetized material of the limit indicators 230, 240. Note that the first sensor and the encoding elements 220 may use the same technology as the limit indicators 230, 240 or different technology, depending on the embodiment.

Figure 3:
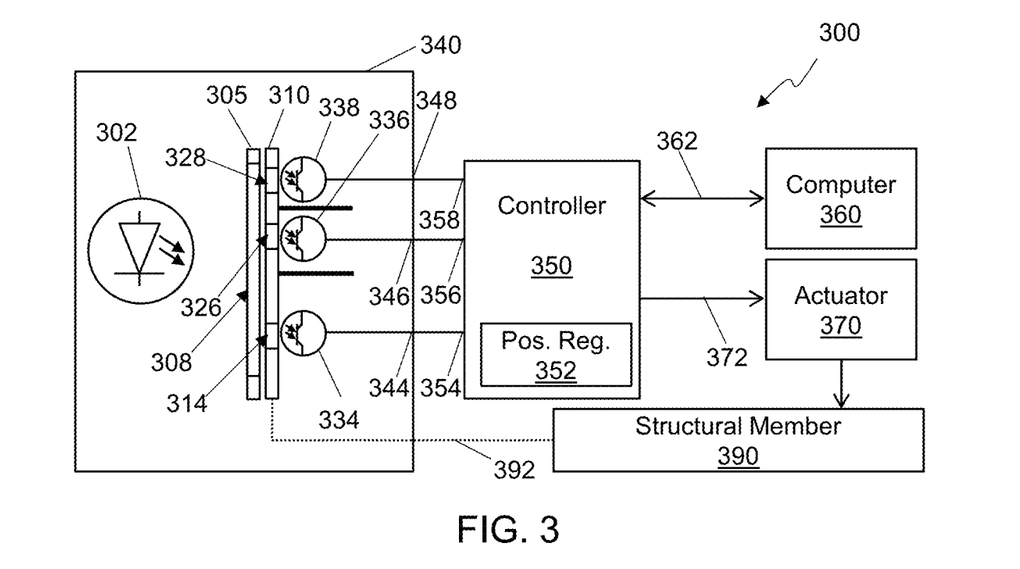
FIG. 3 is a block diagram of an embodiment of a system using an incremental encoder.

FIG. 3 is a block diagram of an embodiment of a system 300 using a position encoder 340. The position encoder 340 may be a linear encoder or a rotary encoder and the embodiment shown uses optical technology to detect motion of the carrier 310 which is coupled 392 to a structural member 390 of the system 300 so that the carrier 310 moves based on motion of the structural member 390. The coupling 392 may use any type of interaction between the structural member 390 and the carrier 310 including, but not limited to, mounting the carrier 310 on a shaft upon which the structural member 390 rotates, gears and/or belts driven by motion of the structural member 390 to drive a shaft or an edge of the carrier 310, and physical attachment of the carrier 310 to the structural member 390. The position encoder 340 may be an absolute encoder in some embodiments, but the description below describes an incremental encoder. The system 300 may also include a controller 350, coupled to the encoder 340, a computer 360 which is coupled to the controller 350 and may issue commands to the controller 350 over the command interface 362, and an actuator 370 which can move the structural member 390 and may be under control of the controller 350 through the actuator interface 372. The actuator 370 may be any type of motor, hydraulic system, pneumatic system, or other mechanism capable of moving the structural member 390.

The position encoder 340 includes a light source 302, an opaque element 305, the carrier 310 positioned adjacent to the opaque element 305, and a first sensor for detecting motion that includes a first sensing element 336 and a second sensing element 338 which may be light-sensitive transistors in some embodiments. A first output 346 is coupled to the first sensing element 336 and a second output 348 is coupled to the second sensing element 338. The first sensing element 336 is positioned to receive light from the light source 302 that may pass through the hole 326 in the carrier 310 when it is lined up with a slit 308 in the opaque element 305 and the second sensing element 338 is positioned to receive light from the light source 302 that may pass through the hole 328 in the carrier 310 when it is lined up with a slit 308 in the opaque element 305. The encoder 340 is configured to provide a first signal at the first output 346 and a second signal at the second output 348 with the first signal having a quadrature relationship with the second signal. The position encoder 340 provides incremental motion indications using the first signal and the second signal which are based on motion of the structural member 390 through its coupling 392 with the carrier 310.

The position encoder 340 also includes a second sensor 334 positioned to receive light from the light source 302 that may pass through the hole 314 in the carrier 310 when it is lined up with a slit 308 in the opaque element 305 and a third output 344 coupled to the second sensor 334. The hole 314 may be a limit indicator that that can be used to generate a limit signal on output 344 to the controller 350 to ensure that the structural member 390 does not exceed predetermined limits to its motion.

The controller 350 may be coupled to the position encoder 340 by a limit input 354 and motion inputs 356, 358. The controller 350 may also include the actuator interface 372 to control the actuator 370 and the command interface 362 to receive commands. The controller 350 may be constructed using electronic circuitry of any type, including, but not limited to a processor and memory storing instructions to be executed by the processor, a purpose-designed integrated circuit, a field-programmable gate array (FPGA) with memory storing configuration information for the FPGA, or any other type and arrangement of active and passive electronic circuitry.

Thus, embodiments may include an article of manufacture comprising a non-transitory storage medium having instructions stored thereon that, if executed, result in one or more methods being performed. Note that the instructions may be configuration information for an FPGA in some embodiments and that executing may refer to configuring the FPGA based on the configuration information to perform one or more methods.

The controller 350 may be designed to prevent movement of the structural member 390 outside of a range of motion predetermined by a configuration of the carrier 310. The carrier 310 may include a first limit indicator 314 and a second limit indicator that can individually generate a limit signal on the limit input 354 of the controller if it is aligned with the second sensor 334. The carrier 310 may be custom designed for a particular application to appropriately limit the motion of the structural member 390.

The controller 350 may receive a command through the command interface 362 to move the structural member 390 coupled to the position encoder 340 to a new position. Depending on the embodiment, the command may provide information on an absolute position of the structural member, or a relative movement of the structural member. The controller 350 may interpret the command to determine how to control the actuator 370 to provide the commanded movement and may not understand whether or not the new position is within the predesignated motion limits of the structural member 390. The controller 350 can then control the actuator 370 through the actuator interface 372 to move the structural member 390 toward the new position.

If the structural member 390 moves to its limit of motion as determined by the placement of the limit indicators on the carrier 310, the position encoder 340 generates a limit indication and sends it to the controller 350 which receives the limit indication through the limit input 354. The controller 350 then stops or reverses the movement of the structural member 390 by controlling the actuator 370 through the actuator interface 372 in response to the receiving of the limit indication. In some embodiments, the controller 350 may provide an indication that motion beyond the predesignated limits was attempted to the computer 360.

In some embodiments, the controller 350 may determine an index position of the position encoder 340. The controller 350 may include a position register 352 that is used to track a position of the encoder 340. The controller 350 may determine that the index position should be determined based on any condition, such as, but not limited to, a power-on condition, a reset, or a received command. In response, the controller 350 may control the actuator 370 through the actuator interface 372 to move the structural member 390 in a first direction until it receives a first limit indication from the position encoder 340 through the limit input 354. The controller 350 may then reset the position register 352 in response to the reception of the first limit indication and control the actuator 370 through the actuator interface 372 to move the structural member 390 in a second direction opposite the first direction. The controller 350 receives motion signals generated by the movement of the structural member 390 from the position encoder 340 through the one or more motion inputs 356, 358 and updates the position register 352 based on the received motion signals until a second limit indication is received from the position encoder 340 through the limit input 354. The controller 350 then stops or reverses the motion of the structural member to avoid moving it outside of its predetermined motion limits.

The index position value for the position encoder 340 is then calculated by multiplying a value of the position register 352 at a time the second limit indication is received by a predetermined percentage. In some embodiments, the controller 350 may subtract the index position value from the value of the position register 352 at the time the second limit indication is received to determine a new value for the position register 352 which is then set in the position register 352. The predetermined percentage may vary based on the particular design of the system and the movement of the structural member 390, but in some embodiments the predetermined percentage is 50% which allows the calculation to be performed by a simple single bit shift of the position register.

Figure 4:
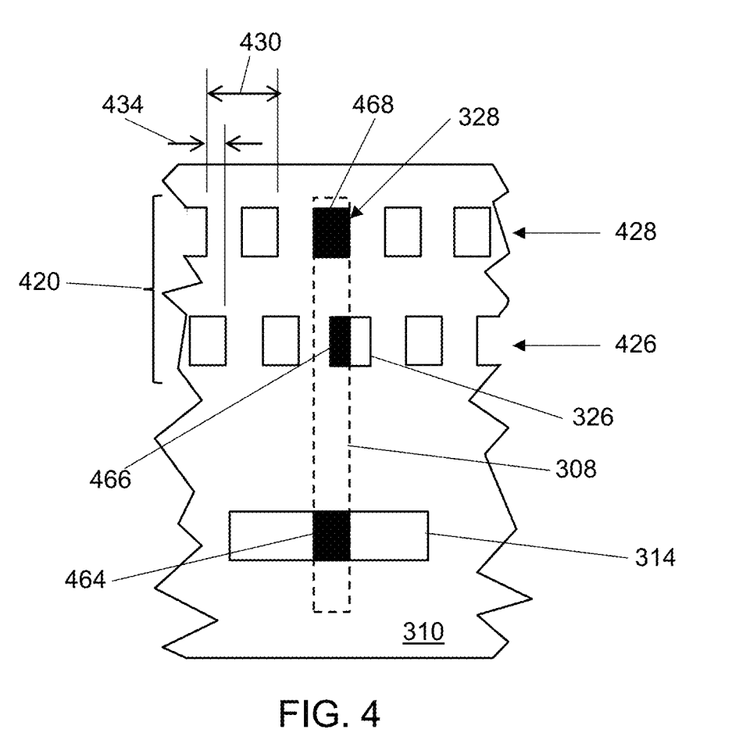
FIG. 4 shows a portion of an embodiment of a quadrature encoding carrier for the incremental encoder of FIG. 3.

FIG. 4 shows a portion of an embodiment of a quadrature encoding carrier 310 for the incremental encoder 340 shown in FIG. 3. The view in FIG. 4 is a view of a portion of the carrier 310 looking from the right to the left in FIG. 3. The carrier 310 may include encoding elements 420 and at least one limit indicator 314. The encoder 340 shown utilizes optical technology and the carrier 310 is constructed from an opaque material with holes through the carrier 310 used for the encoding elements 420 and the limit indicator 314. The encoding elements 420 include a first set of encoding elements 426 that includes hole 326 in a first row or ring and a second set of encoding elements 428 that includes hole 328 in a second row parallel to the first row or in a second ring concentric with the first ring. Both the first set of encoding elements 426 and the second set of encoding elements 428 are arranged at the same pitch distance 430 (i.e. distance apart), but the two sets of encoding elements 426, 428 are offset from each other by a distance 434 equal to one quarter of the pitch distance 430.

The encoder 340 also includes a second opaque element 305 with a slit 308 positioned next to the carrier 310 (behind the carrier 310 as shown in FIG. 4). In other embodiments, the second opaque 305 element may have three separate openings corresponding with the first set of encoding elements 426, the second set of encoding elements 428, and the limit indicator 314. The light source 302 is located behind the carrier 310 and second opaque element 305 in the view shown in FIG. 4, so that as the carrier 310 moves past the slit 308, the carrier 310 selectively allows light to pass through the holes (i.e. encoding elements and limit indicators) in the carrier or blocks the light. In the position shown in FIG. 4, light 464 is coming through a portion of the hole of the limit indictor 314 (limited by the width of slit 308), light 466 is coming through half of hole 326 of the first set of encoding elements 426, and light 468 is coming through the full hole 328 of the second set of encoding elements 428 as it is shown aligned with the slit 308.

So looking back to FIG. 3 with FIG. 4 in mind, as the carrier 310 moves past the slit 308, light from the light source 302 is selectively transmitted to the light sensors 334, 336, 338. Depending on the embodiment, the voltage level generated by the light sensors 336, 338 used for the encoding elements 420 may be used to generate a sine signal 348 and a cosine signal 346 (which have a quadrature relationship) to send to the controller 350, or the voltage level generated by the light sensors 336, 338 used for the encoding elements 420 may be sent to a comparator to generate digital pulses with a quadrature relationship to transmit on outputs 346, 348 to the controller 350.

Figure 5:
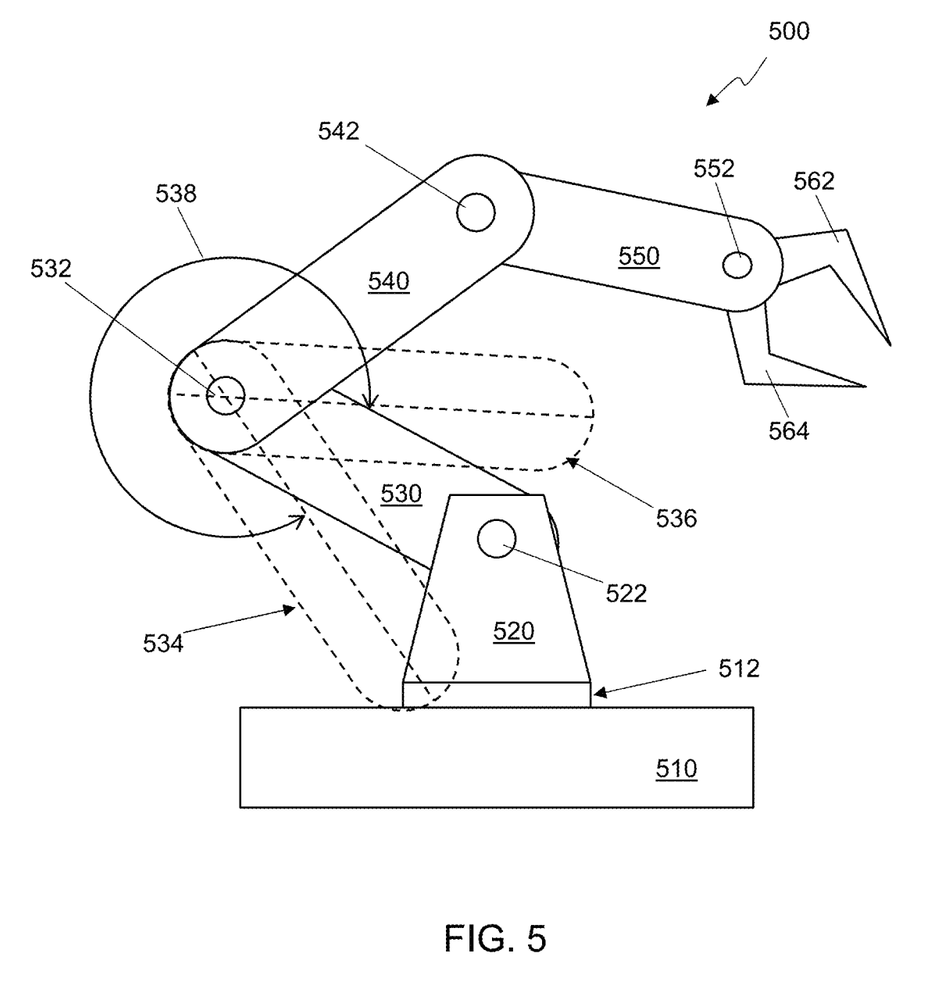
FIG. 5 shows an embodiment of a robotic arm.

FIG. 5 shows an embodiment of a robotic arm 500. The robotic arm 500 may have any number of elements and degrees of freedom of movement, but in the embodiment shown, the robotic arm 500 includes a base 510 which may be fixedly mounted and coupled to a base section 520 through the base pivot 512 to allow the entire arm 500 to rotate about an axis perpendicular to the base 510. A first arm section 530 is coupled to the base section 520 through a first pivot joint 522. A second arm section 540 is coupled to the first arm section 530 by a second pivot joint 532 and a third arm section 550 is coupled to the second arm section 540 by a third pivot joint 542. A claw which has a first finger 562 and a second finger 564 is coupled to the third arm section 550 through pivot joint 552.

The various joints 512, 522, 532, 542, and 552 may have separate actuators to provide for movement between their coupled sections, such as servo motors as a non-limiting example. The shaft of each of the servo motors may be coupled to the carrier of a respective position encoder. A controller may be coupled to the servo motors and position encoders for each joint 512, 522, 532, 542, 552 to control the servo motors and monitor relative positions of the arm segments 520, 530, 540, 550, 562, 564. In various embodiments, a single controller may be able to control the servo motors and monitor the position encoders for two or more of the joints 512, 522, 532, 542, 552, but in some embodiments a separate controller may be used for the servo motor and encoder of a single joint.

The carrier for the position encoder at a particular joint may be individually designed for that application and have limit indicators at locations on the carrier corresponding to limits of motion of the arm segment being controlled. As an example, the second arm segment 540 may be moved by a servo motor at pivot 532 which moves the second arm segment 540 with respect to the first arm segment 530 through the rotation 538 between a first motion limit 534 and a second motion limit 536. A position encoder may be coupled between the first arm segment 530 and the second arm segment 540 to provide motion indications as the two segments 530, 540 move with respect to each other. The carrier of that position encoder may include two limit indications that respectively correspond to the first motion limit 534 and the second motion limit 536 so that if the controller for joint 532 receives a command which attempts to move the second arm segment 540 to a position outside of its predetermined range of motion 538, the controller will receive a limit indication from the position encoder for that joint as the second arm segment 540 reaches its predetermined limit 534 or 536 and stop or reverse the motion of the second arm segment 540 to avoid moving it outside of its range of motion 538.

Because each position encoder can have a customized carrier for its particular application, each joint 512, 522, 532, 542, 552 can have a custom positon encoder to provide limits to its motion. This allows the controller to avoid moving the elements 520, 530, 540, 550, 562, 564 of the arm 500 outside of their predetermined limits.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions or by configuration information for a field-programmable gate array (FPGA). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Similarly, the configuration information for the FPGA may be provided to the FPGA and configure the FPGA to produce a machine which creates means for implementing the functions/acts specified in the flowchart and/or block diagram block or blocks.

These computer program instructions or FPGA configuration information may be stored in a computer readable medium that can direct a computer, other programmable data processing apparatus, FPGA, or other devices to function in a particular manner, such that the data stored in the computer readable medium produce an article of manufacture including instructions which implement the function/act specified in the flowchart and/or block diagram block or blocks. The computer program instructions or FPGA configuration information may also be loaded onto a computer, FPGA, other programmable data processing apparatus, or other devices to cause a series of operational steps to be performed on the computer, FPGA, other programmable apparatus, or other devices to produce a computer implemented process for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code comprising one or more executable instructions, or a block of circuitry, for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
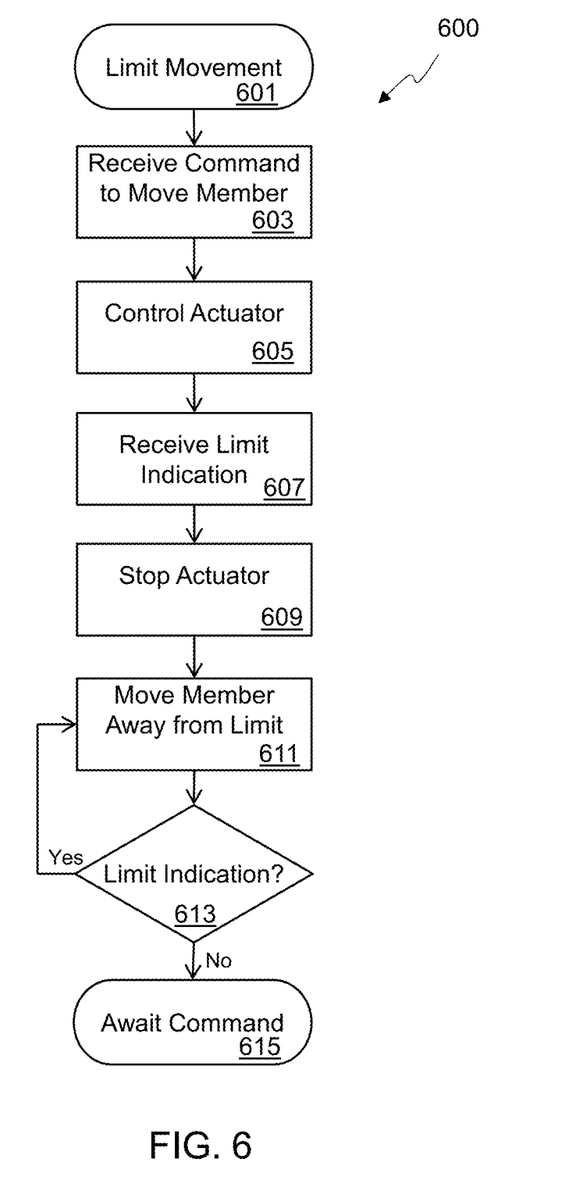
FIG. 6 is a flowchart of a method to limit movement using an incremental encoder with limit indicators.

FIG. 6 is a flowchart 600 of a method to limit movement 601 using a position encoder with limit indicators. A controller may receive 603 a command to move a structural member coupled to the position encoder to a new position. The controller may then control 605 an actuator to move the structural member toward the new position. In some embodiments, the position encoder may be an incremental encoder and incremental position information from a first output and second output of the incremental encoder may be received as the actuator moves the structural member toward the new position. A limit indication may be received 607 from a limit output of the incremental encoder and the movement of the structural member stopped 609 by controlling the actuator in response to the receiving of the limit indication. In some embodiments, the controller may move 611 the structural member away from the limit, reversing its movement, until the limit indication 613 goes away before awaiting the next command 615.

Figure 7:
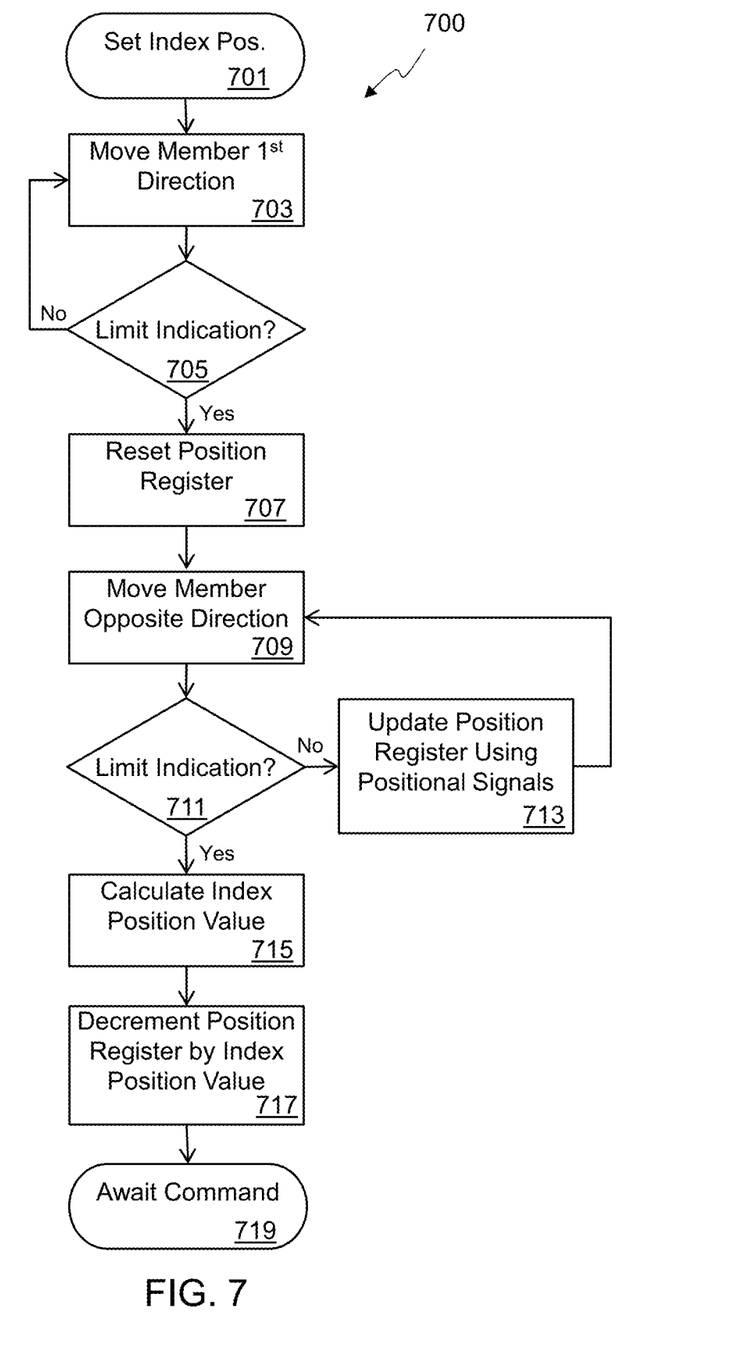
FIG. 7 is a flowchart of a method to set a neutral position in a system using an incremental encoder with limit indicators.

FIG. 7 is a flowchart 700 of a method to set an index position 701 in a system using an incremental encoder with limit indicators. A controller may determine that an index position should be set 701 in response to a power-on condition, a reset, a command received, or from some other condition. The controller may then move 703 a structural member coupled to the incremental encoder in a first direction until an active state of a limit signal from the increment encoder is received 705 at a first time, indicating that a first limit of the incremental encoder has been reached. In response to the detection 705 of the active state of the limit output of the incremental encoder at the first time, a position tracker (e.g. a register, a counter, or a memory location) for the incremental encoder is reset 707 and the structural element is moved 709 in a second direction opposite the first direction. If the incremental encoder is a rotary encoder, the first direction may be clockwise or counterclockwise with the second direction being the other direction of rotation.

Once the structural elements is moving in the second direction, the controller may begin receiving quadrature signals from the incremental encoder and may update 713 the position tracker based on the quadrature signals until the active state of the limit signal from the increment encoder is detected 711 at a second time. In response to the detection 711 of the active state of the limit output of the incremental encoder at the second time, a value of the position tracker is captured and an index position value for the incremental encoder is calculated 715 by multiplying the captured value of the position tracker by a predetermined percentage. The predetermined percentage can be any value between 0% and 100% but in some embodiments a value of 50% may be used which can be implemented by a single bit binary shift of the captured value.

Some embodiments may continue by subtracting 717 the index position value from a current value of the position tracker to determine a new value for the position tracker and setting the position tracker to the new value for the position tracker. Some embodiments may also include the method described in FIG. 6 in addition to the method described in FIG. 7.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "server," "circuitry," "module," "client," "computer," "logic," "FPGA," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for an FPGA or other programmable logic as well as traditional binary computer instructions, and the term "processor" explicitly includes logic in an FPGA or other programmable logic configured by the configuration information in addition to a traditional processing core. Furthermore, "executed" instructions explicitly includes electronic circuitry of an FPGA or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. In addition, the computer program code may be written in VHDL or another hardware description language to generate configuration instructions for an FPGA or other programmable logic. The computer program code if converted into an executable form and loaded onto a computer, FPGA, or other programmable apparatus, produces a computer implemented method. The instructions which execute on the computer, FPGA, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described in the following paragraphs:

Embodiment 1. A component of an incremental rotary encoder comprising: a disc adapted to rotate about an axis of rotation; a first transparent area of the disc positioned at a first polar distance from the axis of rotation and a first radial angle on the disc; a second transparent area of the disc positioned at the first polar distance from the axis of rotation and a second radial angle on the disc, the first radial angle and the second radial angle defining an active sector of the disc; a first set of alternating transparent and opaque areas of the disc spaced at a constant angular pitch positioned at a second polar distance from the axis of rotation and extending at least from the first radial angle to the second radial angle through the active sector of the disc; and a second set of alternating transparent and opaque areas of the disc spaced at the constant angular pitch positioned at a third polar distance from the axis of rotation and extending at least from the first radial angle to the second radial angle through the active sector of the disc, the first set of alternating transparent and opaque areas having a quadrature relationship with the second set of alternating transparent and opaque areas.

Embodiment 2. The component of embodiment 1, the disc comprising an opaque material; the first transparent area, the second transparent area, the first set of transparent areas, and the second set of transparent areas comprising respective holes through the disc.

Embodiment 3. The component of embodiment 1, the disc comprising: at least one layer of a transparent material; and one or more opaque layers, attached to the at least one layer of the transparent material, and patterned to define the first transparent area, the second transparent area, the first set of transparent areas, and the second set of transparent areas.

Embodiment 4. The component of any one of embodiments 1 through 3, the first transparent area, the second transparent area, the first set of transparent areas, and the second set of transparent areas being transparent to at least one wavelength of near infrared light, visible light, or ultraviolet light.

Embodiment 5. A controller for use with a position encoder, the controller comprising: a limit input; an actuator interface; a command interface to receive commands; and circuitry coupled to the limit input, the actuator interface, and the computer interface, the circuitry configured to: receive a command through the command interface to move a structural member coupled to the position encoder to a new position; control an actuator through the actuator interface to move the structural member toward the new position; receive a limit indication from the position encoder through the limit input; and stop or reverse the movement of the structural member by controlling the actuator through the actuator interface in response to the receiving of the limit indication.

Embodiment 6. The controller of embodiment 5, the circuitry comprising a field-programmable gate array (FPGA) and a memory device, coupled to the FPGA comprising configuration information for the FPGA.

Embodiment 7. The controller of embodiment 5 or 6, the controller further comprising one or more motion inputs coupled to the circuitry; the circuitry comprising a position register and further configured to: control the actuator through the actuator interface to move the structural member in a first direction; receive a first limit indication from the position encoder through the limit input; reset the position register in response to the reception of the first limit indication; control the actuator through the actuator interface to move the structural member in a second direction opposite the first direction; receive incremental motion signals generated by the movement of the structural member from the position encoder through the one or more motion inputs; update the position register based on the received incremental motion signals; receive a second limit indication from the position encoder through the limit input; capture a value of the position register in response to the reception of the second limit indication; and calculate an index position value for the position encoder by multiplying the captured value by a predetermined percentage.

Embodiment 8. The controller of embodiment 7, the circuitry further configured to: determine a new value for the position register by subtracting the index position value from the captured value; and set the position register to the new value for the position register.

Embodiment 9. An apparatus comprising: a carrier adapted to move with respect to a first sensor and a second sensor of a position encoder; encoding elements situated on the carrier to interact with the first sensor; a first limit indicator situated at a first location on the carrier to interact with the second sensor at a first position of the carrier corresponding to a first limit of the position encoder; and a second limit indicator situated at a second location on the carrier to interact with the second sensor at a second position of the carrier corresponding to a second limit of the position encoder.

Embodiment 10. The apparatus of embodiment 9, wherein the carrier is adapted to move linearly.

Embodiment 11. The apparatus of embodiment 9, wherein the carrier is adapted to rotate.

Embodiment 12. The apparatus of embodiment 11, wherein the carrier comprises a disc, the first location on the carrier is at a first polar distance from an axis of rotation of the disc and a first radial angle on the disc, and the second location on the carrier is substantially at the first polar distance from the axis of rotation of the disc and a second radial angle on the disc.

Embodiment 13. The apparatus of embodiment 12, further comprising error indicators situated on the disc at the first polar distance from the axis of rotation of the disc to interact with the second sensor at a position of the carrier outside of a normal operational range of the position encoder.

Embodiment 14. The apparatus of embodiment 12 or 13, wherein the encoding elements are located within a range of polar distances from the axis of rotation of the disc that does not include the first polar distance.

Embodiment 15. The apparatus of any one of embodiments 9 through 14, the first limit indicator having a dielectric constant in a first range; and another area on the carrier situated to interact with the second sensor having a second dielectric constant outside of the first range.

Embodiment 16. The apparatus of any one of embodiments 9 through 15, the first limit indicator comprising a magnetized material.

Embodiment 17. The apparatus of any one of embodiments 9 through 16, the first limit indicator comprising a first transparent area of the carrier.

Embodiment 18. The apparatus of embodiment 17, the first transparent area of the carrier comprising a hole through the carrier.

Embodiment 19. The apparatus of embodiment 17 or 18, the first transparent area being transparent to at least one wavelength of near infrared light, visible light, or ultraviolet light.

Embodiment 20. The apparatus of embodiment 9, the carrier comprising a disc of opaque material adapted to rotate about an axis of rotation; the first limit indicator comprising a first transparent area of the disc located at a first polar distance from the axis of rotation and a first radial angle on the disc corresponding to the first limit of the position encoder; and the second limit indicator comprising a second transparent area of the disc positioned at the first polar distance from the axis of rotation and a second radial angle on the disc corresponding to the second limit of the position encoder, the first radial angle and the second radial angle defining an active sector of the disc; the encoding elements comprising: a first set of alternating transparent and opaque areas of the disc spaced at a constant angular pitch positioned at a second polar distance from the axis of rotation and extending at least from the first radial angle to the second radial angle through the active sector of the disc; and a second set of alternating transparent and opaque areas of the disc spaced at the constant angular pitch positioned at a third polar distance from the axis of rotation and extending at least from the first radial angle to the second radial angle through the active sector of the disc, the first set of alternating transparent and opaque areas having a quadrature relationship with the second set of alternating transparent and opaque areas.

Embodiment 21. The apparatus of any one of embodiments 9 through 20, further comprising: the position encoder; a first sensing element and a second sensing element included in the first sensor; a first output coupled to the first sensing element; a second output coupled to the second sensing element; a third output coupled to the second sensor; the apparatus configured to provide a first signal at the first output and a second signal at the second output, the first signal having a quadrature relationship with the second signal to provide incremental motion indications from the position encoder.

Embodiment 22. The apparatus of any one of embodiments 9 through 21, comprising an absolute encoder as the position encoder.

Embodiment 23. The apparatus of any one of embodiments 9 through 22, further comprising: an actuator interface; a command interface to receive commands; and circuitry coupled to the second sensor, the actuator interface, and the computer interface, the circuitry configured to: receive a command through the command interface to move a structural member coupled to the position encoder to a new position; control an actuator through the actuator interface to move the structural member toward the new position; receive a limit indication from the second sensor; and stop or reverse the movement of the structural member toward the new position by controlling the actuator through the actuator interface in response to the receiving of the limit indication.

Embodiment 24. The apparatus of embodiment 23, the apparatus further comprising a position register; the circuitry coupled to the first sensor and further configured to: control the actuator through the actuator interface to move the structural member in a first direction; receive a first limit indication from the second sensor; reset the position register in response to the reception of the first limit indication; control the actuator through the actuator interface to move the structural member in a second direction opposite the first direction; receive incremental motion signals, generated in response to the movement of the structural member, from the first sensor; update the position register based on the received incremental motion signals; receive a second limit indication from the second sensor; capture a value of the position register in response to the reception of the second limit indication; and calculate an index position value for the position encoder by multiplying the captured value by a predetermined percentage.

Embodiment 25. The apparatus of embodiment 24, the circuitry further configured to: determine a new value for the position register by subtracting the index position value from the captured value; and set the position register to the new value for the position register.

Embodiment 26. A method for controlling a structural member coupled to a position encoder, the method comprising: controlling an actuator to move the structural member toward a new position; receiving a limit indication from a limit output of the position encoder; and stopping or reversing the movement of the structural member by controlling the actuator in response to the receiving of the limit indication.

Embodiment 27. A method of embodiment 26, further comprising receiving incremental position information from a first output and a second output of the position encoder as the actuator moves the structural member toward the new position.

Embodiment 28. A method for using an incremental encoder, the method comprising: moving a structural member coupled to the incremental encoder in a first direction; detecting an active state of a limit signal from the incremental encoder at a first time; resetting a position tracker for the incremental encoder in response to the detection of the active state of the limit signal at the first time; moving the structural element in a second direction opposite the first direction; receiving quadrature signals from the incremental encoder as the structural member moves in the second direction; updating the position tracker based on the quadrature signals; detecting the active state of the limit signal from the incremental encoder at a second time; capturing a value of the position tracker in response to the detection of the active state of the limit signal at the second time; and calculating an index position value for the incremental encoder by multiplying the captured value by a predetermined percentage.

Embodiment 29. The method of embodiment 28, further comprising: determine a new value for the position tracker by subtracting the index position value from the captured value; and setting the position tracker to the new value for the position tracker.

Embodiment 30. The method of embodiment 28 or 29, further comprising: moving the structural member toward a new position; receiving the quadrature signals from the incremental encoder as the structural member moves toward the new position; updating the position tracker based on the quadrature signals; detecting the active state of the limit signal from the incremental encoder at a third time; and stopping or reversing the movement of the structural member toward the new position in response to the detection of the active state of the limit signal at the third time.

Embodiment 31. At least one non-transitory machine readable medium comprising one or more instructions that in response to being executed on a computing device cause the computing device to carry out a method according to any one of embodiments 26 to 30.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, π, 3.33, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A controller for use with a position encoder, the controller comprising:
    one or more motion inputs suitable to couple to motion outputs of the position encoder;
    a limit input, separate from the one or more motion inputs, suitable to couple to a limit output of the position encoder;
    an actuator interface;
    a command interface to receive commands; and
    circuitry coupled to the one or more motion inputs, the limit input, the actuator interface, and the command interface, the circuitry configured to:
        receive a command through the command interface to move a structural member coupled to the position encoder to a new position;
        control an actuator through the actuator interface to move the structural member toward the new position;
        receive a limit indication from the position encoder through the limit input; and
        stop or reverse the movement of the structural member by controlling the actuator through the actuator interface in response to the receiving of the limit indication.

2. The controller of claim 1, the circuitry comprising a field-programmable gate array (FPGA) and a memory device, coupled to the FPGA, comprising configuration information for the FPGA.

3. The controller of claim 1, the circuitry comprising a processor and a memory device, coupled to the processor, comprising instructions for the processor in response to receiving the limit indication.

4. The controller of claim 1, the circuitry comprising a position register and further configured to:
    control the actuator through the actuator interface to move the structural member in a first direction;
    receive a first limit indication from the position encoder through the limit input;
    reset the position register in response to the reception of the first limit indication;
    control the actuator through the actuator interface to move the structural member in a second direction opposite the first direction;
    receive incremental motion signals generated by the movement of the structural member from the position encoder through the one or more motion inputs;
    update the position register based on the received incremental motion signals;
    receive a second limit indication from the position encoder through the limit input;
    capture a value of the position register in response to the reception of the second limit indication; and
    calculate an index position value for the position encoder by multiplying the captured value by a predetermined percentage.

5. The controller of claim 4, the circuitry further configured to:
    determine a new value for the position register by subtracting the index position value from the captured value; and
    set the position register to the new value for the position register.

6. The controller of claim 1, the circuitry further configured to provide an indication that motion beyond a predesignated limit was attempted in response to the receiving of the limit indication.

7. The controller of claim 1, the circuitry further configured to:
    reverse the movement of the structural member by controlling the actuator through the actuator interface in response to the receiving of the limit indication;
    detect that the limit indication is no longer being received; and
    stop the movement of the structural member by controlling the actuator through the actuator interface in response to the detection that the limit indication is no longer being received.

8. The controller of claim 1, the one or more motion inputs consisting of a first motion input and a second motion input, the circuitry further configured to:
    use a quadrature relationship between the first motion input and the second motion input to determine an amount and a direction of the movement of the structural member.

9. An article of manufacture comprising at least one non-transitory computer-readable storage medium having computer-readable instructions stored thereon that, when executed by a processor acting as a controller for use with a position encoder, cause the processor to:
    receive a command to move a structural member coupled to the position encoder to a new position;
    control an actuator to move the structural member toward the new position;
    receive a limit indication from a limit output of the position encoder that is separate from one or more motion outputs of the position encoder; and
    stop or reverse the movement of the structural member toward the new position by controlling the actuator in response to the reception of the limit indication.

10. The article of manufacture of claim 9, the instructions further causing the processor to:
    control the actuator to move the structural member in a first direction;
    receive a first limit indication from the limit output of the position encoder;
    reset a position register in response to the reception of the first limit indication;

control the actuator to move the structural member in a second direction opposite the first direction;
receive incremental motion signals generated by the movement of the structural member from the one or more motion outputs of the position encoder;
update the position register based on the received incremental motion signals;
receive a second limit indication from the limit output of the position encoder;
capture a value of the position register in response to the reception of the second limit indication; and
calculate an index position value for the position encoder by multiplying the captured value by a predetermined percentage.

11. The article of manufacture of claim 10, the instructions further causing the processor to:
determine a new value for the position register by subtracting the index position value from the captured value; and
set the position register to the new value for the position register.

12. The article of manufacture of claim 10, the instructions further causing the processor to provide an indication that motion beyond a predesignated limit was attempted in response to the reception of the limit indication.

13. The article of manufacture of claim 10, the instructions further causing the processor to:
reverse the movement of the structural member in response to the reception of the limit indication by controlling the actuator;
detect that the limit indication is no longer being received; and
stop the movement of the structural member in response to the detection that the limit indication is no longer being received by controlling the actuator.

14. The article of manufacture of claim 10, the instructions further causing the processor to use a quadrature relationship between a first motion output and a second motion output to determine an amount and a direction of movement of the structural member, wherein the one or more motion outputs of the position encoder consist of the first motion output and the second motion output.

15. A method of using with a position encoder, the method comprising:
receiving a command to move a structural member coupled to the position encoder to a new position;
controlling an actuator to move the structural member toward the new position;
receiving a limit indication from a limit output of the position encoder that is separate from one or more motion outputs of the position encoder; and
stopping or reversing the movement of the structural member toward the new position by controlling the actuator in response to the receiving of the limit indication.

16. The method of claim 15, the method further comprising:
controlling the actuator to move the structural member in a first direction;
receiving a first limit indication from the limit output of the position encoder;
resetting a position register in response to the reception of the first limit indication;
controlling the actuator to move the structural member in a second direction opposite the first direction;
receiving incremental motion signals generated by the movement of the structural member from the one or more motion outputs of the position encoder;
updating the position register based on the received incremental motion signals;
receiving a second limit indication from the limit output of the position encoder;
capturing a value of the position register in response to the reception of the second limit indication; and
calculating an index position value for the position encoder by multiplying the captured value by a predetermined percentage.

17. The method of claim 16, the method further comprising:
determining a new value for the position register by subtracting the index position value from the captured value; and
setting the position register to the new value for the position register.

18. The method of claim 15, the method further comprising providing an indication that motion beyond a predesignated limit was attempted in response to the reception of the limit indication.

19. The method of claim 15, the method further comprising:
reversing the movement of the structural member in response to the reception of the limit indication by controlling the actuator;
detecting that the limit indication is no longer being received; and
stopping the movement of the structural member in response to the detection that the limit indication is no longer being received by controlling the actuator.

20. The method of claim 15, the method further comprising receiving incremental motion signals generated by the movement of the structural member from the one or more motion outputs of the position encoder, wherein the position encoder comprises:
a first sensor coupled to the one or more motion outputs;
a second sensor coupled to the limit output;
a carrier coupled to the structural member and adapted to move with respect to the first sensor and the second sensor, the carrier including encoding elements situated on the carrier and positioned to interact with the first sensor, a first limit indicator, separate from the encoding elements, situated at a first location on the carrier to interact with the second sensor at a first position of the carrier corresponding to a first limit of the position encoder, and a second limit indicator, separate from the encoding elements and the first limit indicator, situated at a second location on the carrier to interact with the second sensor at a second position of the carrier corresponding to a second limit of the position encoder.

* * * * *